(No Model.)
P. MEYER.
DRAG HARROW.
No. 319,109. Patented June 2, 1885.
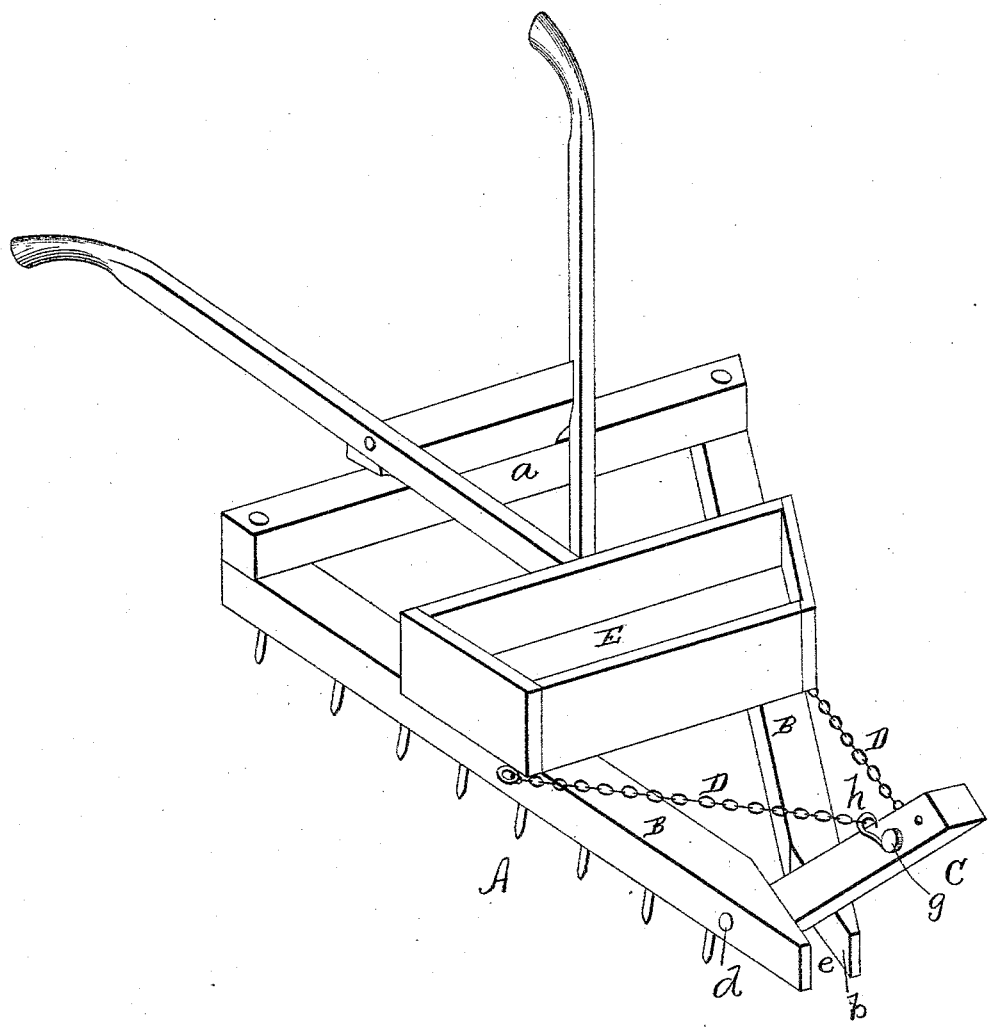

UNITED STATES PATENT OFFICE.

PHILIP MEYER, OF FALLS CITY, ASSIGNOR OF TWO-THIRDS TO JACOB ROYER AND PETER G. MASON, OF RICHARDSON COUNTY, NEBRASKA.

DRAG-HARROW.

SPECIFICATION forming part of Letters Patent No. 319,109, dated June 2, 1885.

Application filed October 29, 1883. (No model.)

*To all whom it may concern:*

Be it known that I, PHILIP MEYER, a citizen of the United States, residing at Falls City, in the county of Richardson and State of Nebraska, have invented certain new and useful Improvements in Harrows, of which the following is a specification, reference being had to the accompanying drawing and the letters of reference thereon, in which the figure is a representation of a harrow with my improvements applied.

The invention has relation to improvements in devices for regulating harrows for deep or shallow cultivating; and it consists in the construction and novel arrangement of devices, as will be hereinafter more fully set forth, and particularly pointed out in the claim appended.

Referring by letter to the said drawing, A indicates the harrow-frame, which consists of the rear transverse bar, *a*, and the longitudinal side converging or diagonal beams, B B. These beams B are secured at their rear ends to the transverse bar *a* by means of vertical bolts and nuts, and provided on their under face with harrow-teeth of any approved construction. The forward adjacent faces of the converging side beams, B, are cut obliquely, as shown at *b*, and connected together by a pivot-bolt, *d*, with an interposed adjustable draft-beam, C. Between the oblique faces of these side beams is a space, *e*, for the adjustment of the draft-beam.

The draft-beam C is provided near its upper or outer end with a transverse bolt, *g*, carrying at its respective ends on opposite sides of the said beam a hook, *h*, and is also provided at its outer or upper end with means for connecting the draft.

D indicates chains, which are connected at their rear ends by staples or other suitable means to the side beams, B, of the frame as shown, their opposite ends being connected to the draft-beam by means of the hooks *h*, which will permit of their being lengthened or shortened as desired, according to the adjustment for the earth to be cultivated.

E indicates a box supported upon the beams B B, and is adapted in the present instance to serve the double function of a weight-box and receptacle for the chains D when disconnected from the hooks *h* and not in use, thus avoiding the objectionable necessity of removing or unfastening the chains from the beams B when it is desirable to bring the draft of the harrow at the pivot-bolt *d*.

By this construction it will be perceived that the draft may be regulated on the harrow-frame by taking up and letting out the chains at the hooks of the draft-beam, and when found desirable for cultivating same ground the chains may be entirely disconnected from the hooks and placed in the box E, when the draft will be brought directly on the forward end of the frame at the pivot-bolt *d*. Therefore, it will be readily seen that my improvements may be applied to the ordinary triangular harrow without impairing its usefulness in any manner whatever.

I am aware that various means have been employed for carrying the draft to the rear portion of the frame, and therefore do not claim such devices, broadly.

I am also aware that a weight-box has been used on a clod-crusher for the simple purpose of weighting the device at will.

I attach importance to the fact that my draft-bar is pivoted between the points of the bars B by the single bolt, which holds said bars in position; that the hooks *h* are fixed upon the bolt *g*, and have liberty to turn to accommodate the angle at which the draft-bar may be adjusted, and that the chains D connect the draft-beam with the frame at a point adjacent to the load in the box E.

What I claim, and desire to secure by Letters Patent, is—

The drag-harrow described, consisting of the frame *a* B, the draft-beam C, pivoted between the forward ends of the beams B by the bolt *d*, which secures the frame, and having the loose bolt *g* with hooks *h*, the weight-box E, and the chains D, connecting the draft-bar with the frame at a point adjacent to the load or weight, whereby the strain on the harrow may be adjusted at will with reference to the weight and the quality of soil, as set forth.

PHILIP MEYER.

Witnesses:
W. W. WARDELL,
W. S. CAMERON.